(12) United States Patent
Huang

(10) Patent No.: US 10,181,744 B2
(45) Date of Patent: Jan. 15, 2019

(54) CAPACITIVE POWER CONVERSION CIRCUIT AND CHARGING CONTROL METHOD THEREOF

(71) Applicant: RICHTEK TECHNOLOGY CORPORATION, Zhubei, HsinChu (TW)

(72) Inventor: Tsung-Wei Huang, Taipei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 99 days.

(21) Appl. No.: 15/602,605

(22) Filed: May 23, 2017

(65) Prior Publication Data

US 2018/0083457 A1 Mar. 22, 2018

Related U.S. Application Data

(60) Provisional application No. 62/396,897, filed on Sep. 20, 2016, provisional application No. 62/411,046, filed on Jan. 21, 2016.

(30) Foreign Application Priority Data

Mar. 22, 2017 (CN) .......................... 2017 1 0173266

(51) Int. Cl.
*H02J 7/00* (2006.01)
*H02M 3/04* (2006.01)
*H02M 7/04* (2006.01)
*H02M 3/07* (2006.01)

(52) U.S. Cl.
CPC ............... *H02J 7/007* (2013.01); *H02M 3/04* (2013.01); *H02M 3/07* (2013.01); *H02M 7/04* (2013.01)

(58) Field of Classification Search
USPC .......................... 320/103, 107, 108, 109, 145
See application file for complete search history.

(56) References Cited

U.S. PATENT DOCUMENTS

| 2012/0223670 A1* | 9/2012 | Kinjo | H02J 3/32 320/103 |
| 2016/0172877 A1* | 6/2016 | Xue | H02J 7/0052 320/145 |
| 2018/0083456 A1* | 3/2018 | Huang | H02J 7/007 |

* cited by examiner

*Primary Examiner* — Brian Ngo
(74) *Attorney, Agent, or Firm* — Tung & Associates

(57) ABSTRACT

A capacitive power converter circuit converts a DC power from a bus node to a charging power for charging a battery in a charging mode, and converts a battery voltage to a supply voltage through the bus node in a supply mode. The capacitive power converter circuit includes a conversion switch circuit including plural conversion switches configured to be operably coupled to one or more conversion capacitors, and a conversion control circuit for controlling the plural conversion switches. In the charging mode, the plural conversion switches control the conversion capacitors such that the charging current is scaled-up, and in the supply mode, the plural conversion switches control the conversion capacitors such that the supply voltage is scaled-up.

12 Claims, 4 Drawing Sheets

CAPACITIVE POWER CONVERSION CIRCUIT AND CHARGING CONTROL METHOD THEREOF

CROSS REFERENCE

The present invention claims priority to U.S. 62/396,897, filed on Sep. 20, 2016; U.S. 62/411,046, filed on Oct. 21, 2016; and CN 201710173266.X, filed on Mar. 22, 2017.

BACKGROUND OF THE INVENTION

Field of Invention

The present invention relates to a capacitive power conversion circuit; particularly, it relates to a capacitive power conversion circuit capable of performing bi-directional current or voltage scaling conversion. The present invention also relates to a charging control method for use in the capacitive power conversion circuit.

Description of Related Art

FIG. 1 shows a prior art charger circuit (charger circuit 1) which comprises an adaptor 11 capable of directly charging a battery 50. The adaptor 11 can provide a charging current through a cable 20 (for example a USB cable) and a load switch 40 to the battery 50 to charge the battery 50 by a constant current, wherein the DC current IDC and the charging current ICHG are substantially the same. However, when using a USB standard cable, the maximum current is limited by the cable current rating, which is 5 A or lower, and therefore a longer charging time is required. If it is desired to raise the charging current, for example to 8 A or higher to expedite the charging time, a specially-designed fast charging cable with a larger diameter is required. However, it is inconvenient to use the fast charging cable, because first, it is a non-standard cable, and second, the fast charging cable is less flexible for accommodation due to its larger diameter.

FIGS. 2A and 2B show a prior art charger circuit (charger circuit 2) which includes a switching conversion circuit 60. In a charging mode, the switching conversion circuit 60 converts the power provided by the adaptor 11 (for example but not limited to 5V, 9V, or 12V VBUS compliant with USB PD specification) to a charging current ICHG to charge the battery 50 by a constant current. In this prior art, the charging current ICHG may be larger than the DC current IDC. And in a supply mode, the prior art shown in FIG. 2A can support the USB OTG (On-The-Go) specification. Referring to FIG. 2B, the switching conversion circuit 60 can reversely convert the battery voltage VBAT into an output power compliant with USB OTG specification (for example compliant with USB or USB PD specification) and supply the output power to a USB OTG load (not shown). A drawback of the prior art circuit in 2A and 2B is that it is very difficult to optimize the choices of the specifications of the inductor and switches (both not shown) of the switching conversion circuit 60 so that critical parameters such as the charging current, current ripple amplitude, conduction resistance of the switch, power conversion efficiency and etc. can be optimized.

Compared to the prior art in FIG. 1, the present invention is advantageous in providing a scale-up charging current for charging a battery to shorten the charging time, while a standard cable such as a USB compliant cable can be used, through which only a relatively lower current is allowed. Compared to the prior art in FIGS. 2A and 2B, the present invention is advantageous in not requiring an inductor, having a smaller size, lower cost, and easier optimization for component selections to maximize power conversion efficiency.

SUMMARY OF THE INVENTION

From one perspective, the present invention provides a capacitive power conversion circuit, configured to operably convert a DC power to a charging power on a bus node for charging a battery in a charging mode, wherein the DC power includes a DC voltage and a DC current, the charging power includes a charging voltage and a charging current, and the battery includes a battery voltage, and the capacitive power conversion circuit being configured to operably convert the battery voltage to a supply voltage in a supply mode; the capacitive power conversion circuit comprising: a conversion switch circuit which includes plural conversion switches, configured to be operably coupled to one or more conversion capacitors; and a conversion control circuit, configured to operably generate a switch control signal to control the plural conversion switches; wherein in the charging mode, the switch control signal operates the plural conversion switches so as to electrically connect the one or more conversion capacitors between a pair of nodes selected from one or more charging voltage division nodes, the DC output voltage, and a ground node periodically during plural charging conversion time periods, such that the charging current is scaled-up of the DC current substantially by a predetermined current scale-up factor, the current scale-up factor being larger than 1 whereby the charging current is larger than the DC current, wherein the charging power is electrically connected to one of the one or more voltage division nodes; and in the supply mode, the switch control signal operates the plural conversion switches so as to electrically connect the one or more conversion capacitors between a pair of nodes selected from one or more supply voltage division nodes, the battery voltage, and the ground node periodically during plural supply conversion time periods, to generate an output signal on one of the one or more supply voltage division nodes, and generate a supply voltage on the bus node according to the output signal, such that the supply voltage is scaled-up of the battery voltage substantially by a predetermined voltage scale-up factor.

In one embodiment, the one or more conversion capacitors include a first and a second conversion capacitors, and the plural supply conversion time periods includes 3 supply conversion time periods, wherein in the supply mode, during the 3 supply conversion time periods, the switch control signal operates the conversion switches so as to electrically connect the first and the second conversion capacitors between a pair of nodes selected from the plural supply voltage division nodes, the battery voltage, and the ground node periodically, such that the voltage scale-up factor is substantially 4/3, wherein in a steady state in the supply mode, the voltages across the first and the second capacitors are substantially 2/3 and 1/3 of the battery voltage respectively.

In one embodiment, the conversion capacitors include a first and a second conversion capacitors, and the plural supply conversion time periods includes 2 supply conversion time periods, wherein in the supply mode, during the 2 supply conversion time periods, the switch control signal operates the conversion switches so as to electrically connect the first and the second conversion capacitors between a pair of nodes selected from the plural supply voltage division nodes, the battery voltage, and the ground node periodically, such that the voltage scale-up factor is substantially 3/2, wherein in a steady state in the supply mode in the supply mode, the voltages across the first and the second capacitors are both substantially 1/2 of the battery voltage.

In one embodiment, the conversion capacitors include a first and a second conversion capacitors, and the plural charging conversion time periods includes a first and a second charging conversion time periods; wherein in the charging mode, the switch control signal operates the conversion switches so as to electrically connect a first node of the first conversion capacitor to the DC voltage and the charging voltage during the first and the second charging conversion time periods respectively, and electrically connect a second node of the first conversion capacitor to the charging voltage and the ground node during the first and the second charging conversion time periods respectively, and electrically connect a first node of the second conversion capacitor to the DC voltage and the charging voltage during the second and the first charging conversion time periods respectively, and electrically connect a second node of the second conversion capacitor to the charging voltage and the ground node during the second and the first charging conversion time periods respectively, such that the charging current is substantially 2 times the DC current.

In one embodiment, the capacitive power conversion circuit further includes a linear regulation circuit configured to operably convert the output signal to the supply voltage on the bus node in the supply mode, wherein the conversion control circuit further generates a linear regulation signal to control a regulation switch of the linear regulation circuit in a linear region of the regulation switch, such that the supply voltage is regulated to a predetermined output voltage, and in the charging mode, the regulation switch is controlled to be conductive.

In one embodiment, there are plural options of the predetermined voltage scale-up factors, and in the supply mode, the conversion control circuit further determines the predetermined voltage scale-up factor according to a battery voltage related signal, such that the output signal is close to but larger than the supply voltage and the voltage between an input node and an output node of the regulation switch is smaller than a predetermined dropout voltage.

In one embodiment, the input power is compliant with the Universal Serial Bus or Universal Serial Bus Power Delivery (USB or USB PD) specification, and the supply voltage is compliant with the USB On-The-Go (OTG) specification.

From another perspective, the present invention provides a power conversion method, comprising: converting a DC power to a charging power on a bus node for charging a battery by a capacitive power conversion circuit in a charging mode, wherein the DC power includes a DC voltage and a DC current, the charging power includes a charging voltage and a charging current, and the battery includes a battery voltage; and converting the battery voltage to a supply voltage in a supply mode; wherein the capacitive power conversion circuit comprises a conversion switch circuit which includes plural conversion switches, configured to be operably coupled to one or more conversion capacitors; wherein the step of converting the DC power to the charging power in the charging mode includes: during plural charging conversion time periods, operating the plural conversion switches so as to electrically connect the one or more conversion capacitors between a pair of nodes selected from one or more charging voltage division nodes, the DC voltage, and a ground node periodically, such that the charging current is scaled-up of the DC current substantially by a predetermined current scale-up factor, the current scale-up factor being larger than 1 whereby the charging current is larger than the DC current; and electrically connecting the charging power to one of the one or more charging voltage division nodes; wherein the step of converting the battery voltage to the supply voltage in the supply mode includes: during plural supply conversion time periods, operating the plural conversion switches so as to electrically connect the one or more conversion capacitors between a pair of nodes selected from one or more supply voltage division nodes, the battery voltage, and the ground node periodically to generate an output signal on one node among the one or more supply voltage division nodes; and generating the supply voltage on the bus node according to the output signal, such that the supply voltage is scaled-up of the battery voltage substantially by a predetermined voltage scale-up factor.

In one embodiment, the conversion capacitors include a first and a second conversion capacitors, and the plural supply conversion time periods includes 3 supply conversion time periods; wherein in the supply mode, the step of converting the battery voltage to the supply voltage includes: during the 3 supply conversion time periods, operating the conversion switches so as to electrically connect the first and the second conversion capacitors between a pair of nodes selected from the plural supply voltage division nodes, the battery voltage, and the ground node periodically, such that the voltage scale-up factor is substantially 4/3, wherein in a steady state in the supply mode, the voltages across the first and the second capacitors are substantially 2/3 and 1/3 of the battery voltage respectively.

In one embodiment, the conversion capacitors include a first and a second conversion capacitors, and the plural supply conversion time periods includes 2 supply conversion time periods, wherein in the supply mode, the step of converting the battery voltage to the supply voltage includes: operating the conversion switches so as to electrically connect the first and the second conversion capacitors between a pair of nodes selected from the plural supply voltage division nodes, the battery voltage, and the ground node periodically, such that the voltage scale-up factor is substantially 3/2, wherein in a steady state in the supply mode, the voltages across the first and the second capacitors are both substantially 1/2 of the battery voltage.

In one embodiment, the power conversion method further includes: in the supply mode, controlling a regulation switch of a linear regulation circuit in a linear region of the regulation switch to convert the output signal to the supply voltage on the bus node, wherein the supply voltage is regulated to a predetermined output voltage; and in the charging mode, controlling the regulation switch to be conductive.

In one embodiment, there are plural options of the predetermined voltage scale-up factors, and the power conversion method further determines the predetermined voltage scale-up factor according to a battery voltage related signal in the supply mode, such that the output signal is close to but larger than the supply voltage and the voltage between an input node and an output node of the regulation switch is smaller than a predetermined dropout voltage in the supply mode.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
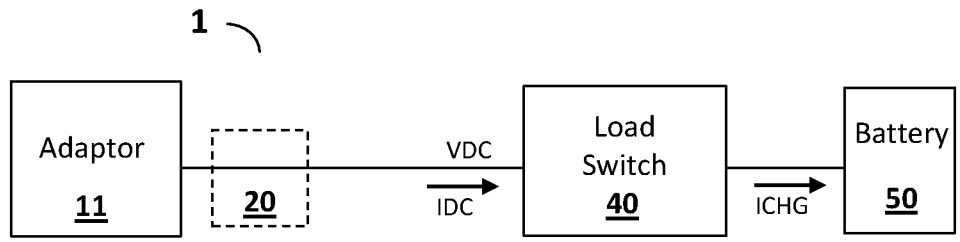
FIG. 1 shows a schematic diagram of a prior art charger circuit.
Figure 2A:
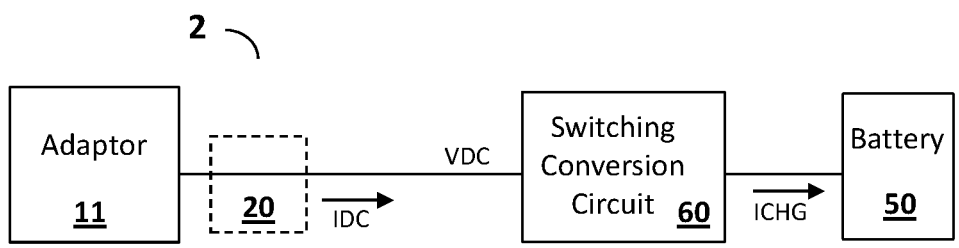
FIGS. 2A and 2B show schematic diagrams of a prior art charger circuit.
Figure 2B:
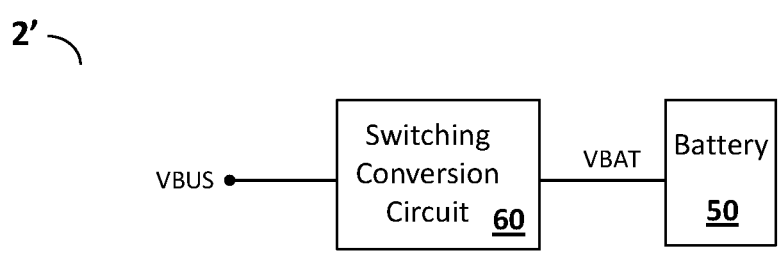
Figure 3:
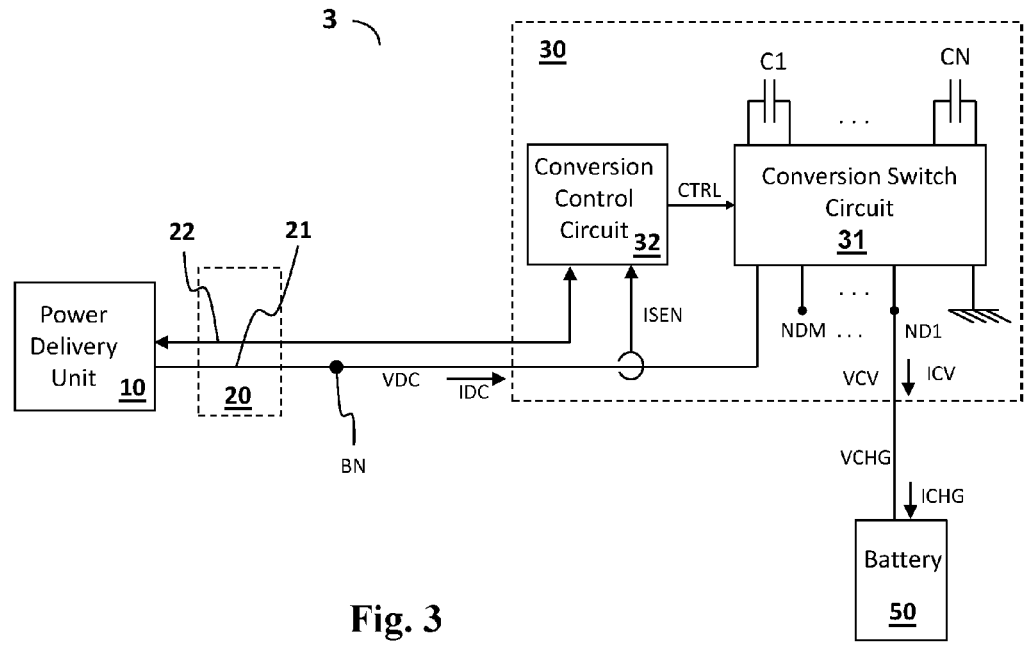
FIG. 3 shows a schematic diagram of an embodiment of the capacitive power conversion circuit according to the present invention.

FIG. 3 shows one embodiment of the capacitive power conversion circuit according to the present invention (capacitive power conversion circuit 30). As shown in the figure, the capacitive power conversion circuit 30 is configured to operably convert a DC power on a bus node BN to a charging power for charging a battery 50 in a charging mode, wherein the DC power includes a DC voltage VDC and a DC current IDC, the charging power includes a charging voltage VCHG and a charging current ICHG, and the battery includes a battery voltage VBAT.

The capacitive power conversion circuit 30 comprises: a conversion switch circuit 31 which includes plural conversion switches (to be shown in FIG. 6), coupled to one or more conversion capacitors (for example C1 or C1-CN shown in FIG. 3); and a conversion control circuit 32, configured to operably generate a switch control signal CTRL to control the plural conversion switches.

As shown in the figure, a power delivery unit 10 converts an input power to the DC power on the bus node BN. The power delivery unit 10 may be for example a power adaptor which converts the input power in AC form to the aforementioned DC power, or may be a DC-DC conversion circuit which converts the input power providing from for example a power bank to the aforementioned DC power. In one embodiment, the power delivery unit 10 can support a constant current direct charging mode in which the power delivery unit 10 can directly charge the battery 50 bypassing the control of the capacitive power conversion circuit 30 (related circuitry not shown). In the charging mode, the power delivery unit 10 regulates the DC current IDC, and during plural charging conversion time periods, the switch control signal CTRL operates the plural conversion switches so as to electrically connect the one or more conversion capacitors (C1 or C1-CN) between a pair of nodes selected from one or more charging voltage division nodes (corresponding to for example ND1 or ND1-NDM, wherein M is a natural number), the bus node BN, and a ground node periodically, such that the charging current ICHG is scaled-up substantially by a predetermined current scale-up factor K, i.e., ICHG is K times IDC. In one preferred embodiment, K is a real number larger than 1, in other words, the charging current ICHG is larger than the DC current IDC. Therefore, with the same level of the DC current IDC, the charger circuit of the present invention can charge the battery 50 with a relatively larger charging current ICHG to reduce the charging time. Note that the charging power is electrically connected to one of the charging voltage division nodes (for example ND1 shown in FIG. 3) to generate the charging current ICHG through the node. In one embodiment, the capacitive power conversion circuit 30 may include for example but not limited to a divider charge pump.

Note that the term "predetermined" may be a fixed value, or an adjustable variable, throughout the text. Also note that although it is intended to regulate the charging current ICHG substantially at a level which is the predetermined current scale-up factor K times the DC current IDC, however due to non-idealities caused by for example imperfect manufacture of components or imperfect matching among components, the actual level of the charging current ICHG may not be exactly equal to K times IDC, but just close to K times, and so the term "substantially" is used to express that there can be a reasonable range of tolerance. Also note that in one embodiment with only one voltage division node, the factor K is 2, that is, the charging current ICHG is substantially 2 times IDC. In other embodiments with plural voltage division nodes, the factor K varies depending on which node the charging power is electrically connected to, and K is not limited to being an integer.

Also note that it is not necessarily required for the power delivery unit 10 to regulate the DC current IDC. In one embodiment, the power delivery unit 10 can alternatively regulate the DC voltage VDC. Under this circumstance, the capacitive power conversion circuit 30 can operate to regulate the charging voltage VCHG at a level which is substantially a predetermined voltage scaling factor K' times the DC voltage VDC. In one preferred embodiment, K' is less than 1 for achieving capacitive step-down power conversion.

Still referring to FIG. 3, in one embodiment, the power delivery unit 10 is coupled to the capacitive power conversion circuit (for example the capacitive power conversion circuit 30) by a cable 20 and/or a connector. The cable 20 or the connector may be for example but not limited to a USB PD or USB compliant cable or connector which include a power line 21 and a signal line 22, wherein the power line 21 transmits the DC power. Note that the cable 20 or the connector is not necessarily required and may be omitted in other embodiments.

Still referring to FIG. 3, in one embodiment, the conversion control circuit 32 senses the DC current IDC to generate a current related signal (for example ISEN as shown in the figure), and the power delivery unit 10 regulates the DC current IDC according to the current related signal ISEN. In one preferred embodiment, the conversion control circuit 32 transmits the current related signal ISEN to the power delivery unit 10 through the signal line 22.

Figure 4:
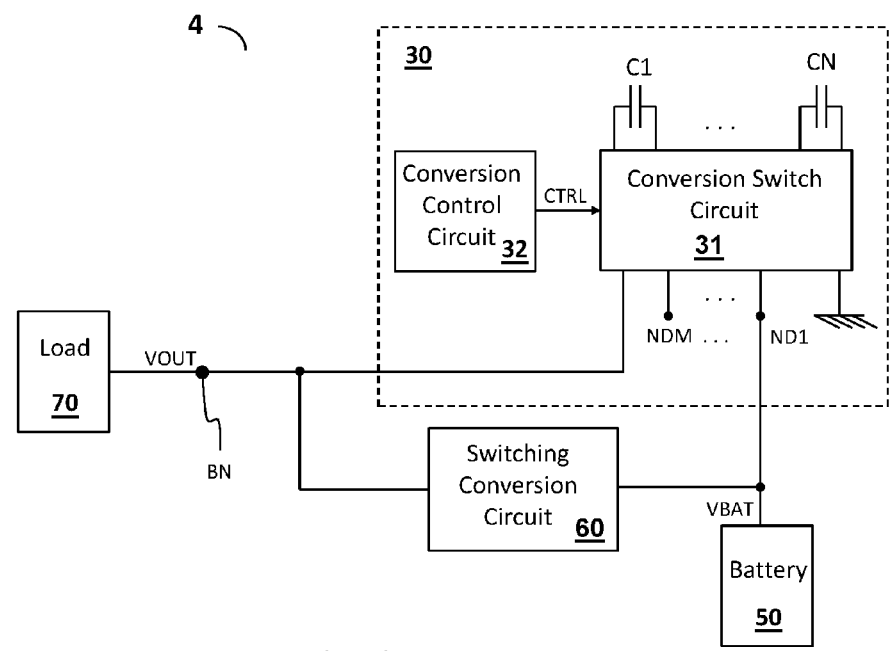
FIG. 4 shows a schematic diagram of an embodiment of the capacitive power conversion circuit according to the present invention.

In many applications, the charger circuit described above is required to be compliant with the USB On-The-Go (OTG) specification, which requires generating a supply voltage from the battery voltage (power delivery in a reverse direction, opposite to the charging direction). That is, in a supply mode, the charger circuit should be able to convert the battery voltage to a supply voltage, which is supplied to a USB OTG compliant load through the bus node. Referring to FIG. 4, in one embodiment, the charger circuit 4 further includes a switching conversion circuit 60 (e.g. a switching boost circuit), which can convert the battery voltage VBAT to a supply voltage VOUT on the bus node BN in the supply mode, to supply power to a USB OTG load 70 (for example a USB OTG compliant flash memory card).

In one embodiment, the capacitive power conversion circuit according to the present invention can also convert the battery voltage VBAT to a supply voltage VOUT in a supply mode without an extra conversion circuit such as the switching conversion circuit 60 shown in FIG. 4. Referring to one embodiment shown in FIG. 5A, in a supply mode, during plural supply conversion time periods, the capacitive power conversion circuit (capacitive power conversion circuit 30A which includes the capacitive power conversion circuit 30 as shown in FIG. 3) can operate the plural conversion switches by the switch control signal CTRL so as to electrically connect the one or more conversion capacitors (C1 or C1-CN) between a pair of nodes selected from one or more supply voltage division nodes (for example NS1 or NS1-NSQ shown in FIG. 5A, Q is a natural number), the battery voltage VBAT, and the ground node periodically to generate an output signal VPO on one node (for example NSQ shown in FIG. 5A) among the one or more supply voltage division nodes (NS1 or NS1-NSQ), and generate a supply voltage VOUT on the bus node BN according to the output signal VPO, such that the supply voltage of VOUT is scaled-up of the battery voltage of VBAT substantially by a predetermined voltage scale-up factor J.

Figure 5A:
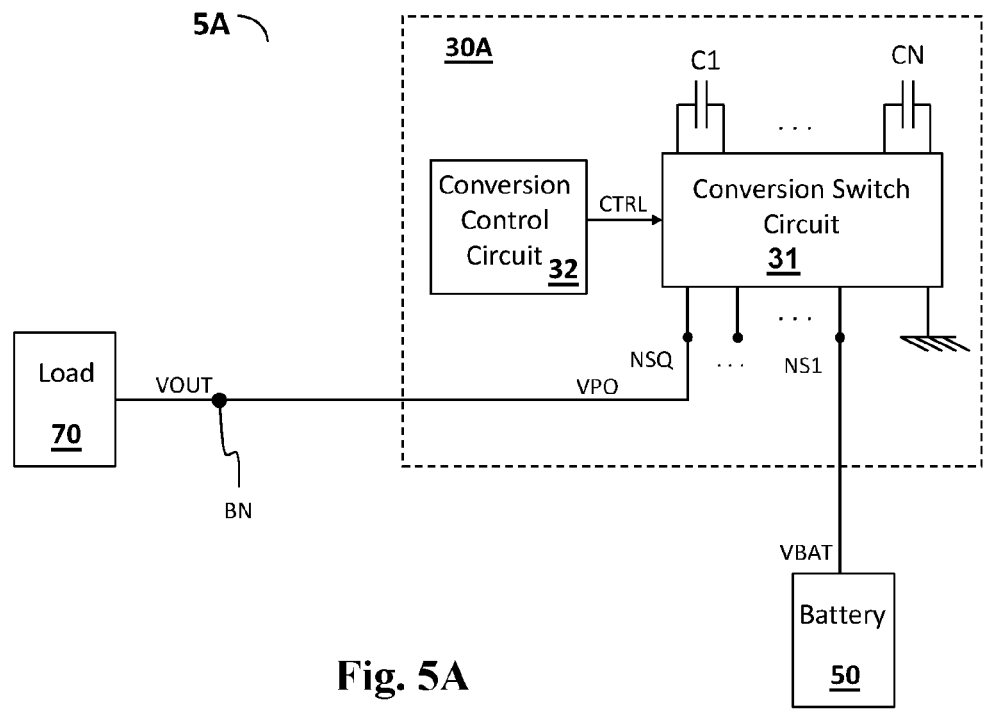
FIGS. 5A and 5B show schematic diagrams of embodiments of the capacitive power conversion circuit according to the present invention.
Figure 5B:
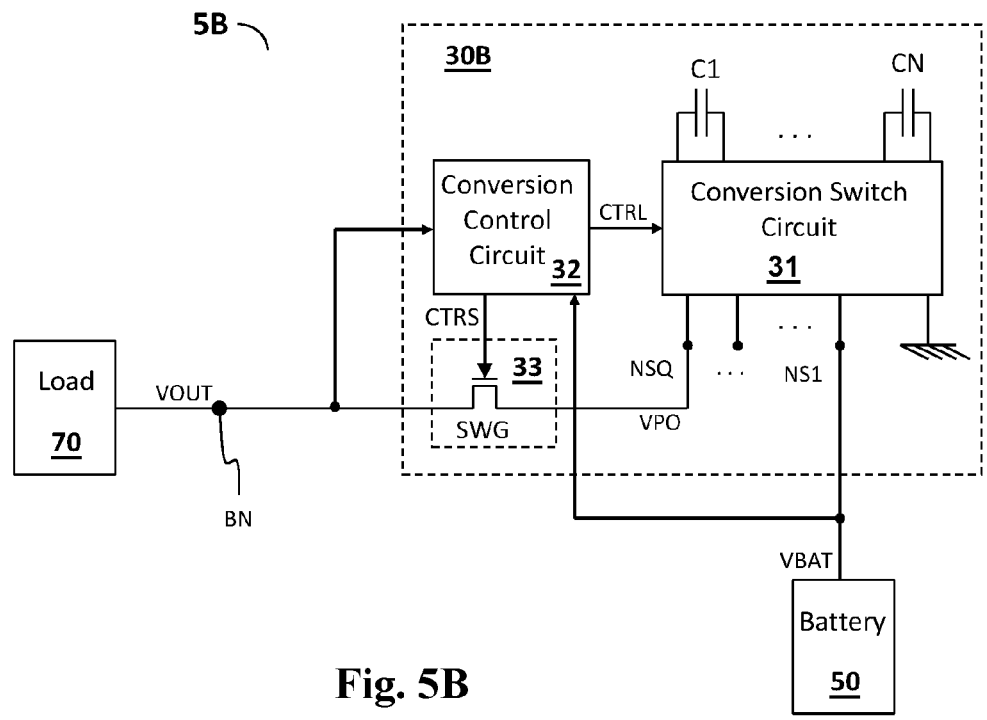

Referring to FIG. 5B, in order to make the supply voltage VOUT closer to USB OTG specification (for example but not limited to 5V), in one embodiment, the capacitive power conversion circuit (for example the capacitive power conversion circuit 30B) may further include a linear regulation circuit 33 configured to operably convert the output signal VPO to the supply voltage VOUT on the bus node BN in the supply mode. In this embodiment, the conversion control circuit 32 further generates a linear regulation signal CTRS to control a regulation switch SWG of the linear regulation circuit 33 in a linear region of the regulation switch SWG, such that the supply voltage of VOUT is regulated to a predetermined output voltage (for example 5V).

Note that when the linear regulation circuit is included, in one embodiment, the regulation switch (such as SWG) can be controlled to be conductive in the charging mode, such that the capacitive power conversion circuit can perform charging operation with the aforementioned scale-up current.

Also note that the capacitive power conversion circuit (e.g. 30A, 30B) according to FIG. 5A or 5B of the present invention performs the power conversion by capacitive operations (i.e., by means of switching the connections of capacitors) both in the charging mode to charge the battery or in the supply mode to provide power to the USB OTG compliant load; hence, an inductor in a switching power conversion circuit (such as in a switching buck, boost, or buck-boost power converter circuit) is not required to reduce the cost and the size of the circuitry. In addition, in the capacitive power conversion circuit of the present invention, the current charging operation and the voltage supply operation share the same conversion capacitors (e.g. the aforementioned one or more conversion capacitors C1 or C1-CN) and conversion switches, and hence the present invention can further reduce the cost and size.

Figure 6:
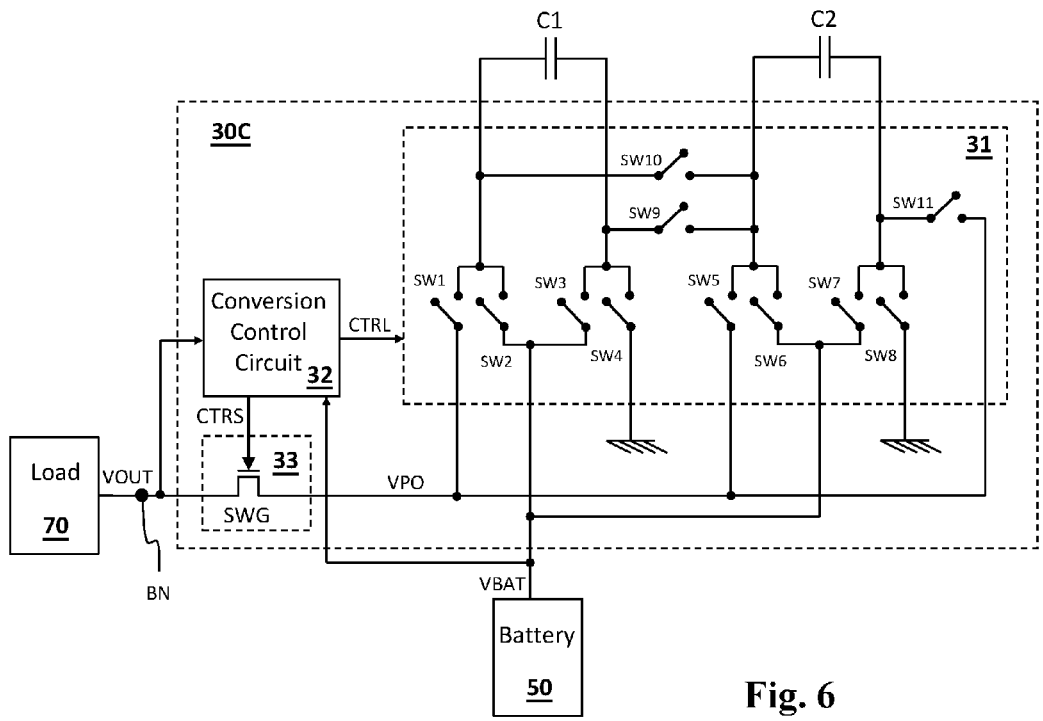
FIG. 6 shows a schematic diagram of a specific embodiment of the capacitive power conversion circuit according to the present invention.

Referring to FIG. 6 which shows a schematic diagram of one specific embodiment of the capacitive power conversion circuit according to the present invention (capacitive power conversion circuit 30C). As shown in the figure, in this embodiment, the conversion capacitors include a first and a second conversion capacitors C1 and C2, and the plural charging conversion time periods includes a first and a second charging conversion time periods. In the charging mode, the conversion control circuit 32 operates the conversion switches (e.g. the conversion switches SW1-SW10 as shown in the figure) by the switch control signal CTRL so as to electrically connect a first node of the first conversion capacitor C1 to the DC voltage VDC and the charging voltage VCHG during the first and the second charging conversion time periods respectively, and electrically connect a second node of the first conversion capacitor C1 to the charging voltage VCHG and the ground node during the first and the second charging conversion time periods respectively, and electrically connect a first node of the second conversion capacitor C2 to the DC voltage VDC and the charging voltage VCHG during the second and the first charging conversion time periods respectively, and electrically connect a second node of the second conversion capacitor C2 to the charging voltage VCHG and the ground node during the second and the first charging conversion time periods respectively, such that the charging current of ICHG is substantially 2 times the DC current of IDC. Note that in this embodiment, C1 and C2 are switched inversely (in opposite phase) between the aforementioned node pairs.

Figure 7A:
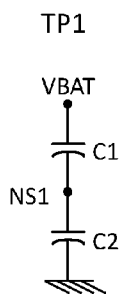
FIGS. 7A and 7B show schematic diagrams of equivalent circuits of the capacitive power conversion circuit according to the present invention.

Referring to FIGS. 6 and 7A. FIG. 7A shows a schematic diagram of an equivalent circuit of the capacitive power conversion circuit during different supply conversion periods with a voltage scale-up factor J of 3/2. In this embodiment, in the supply mode, the plural supply conversion time periods includes 2 supply conversion time periods (e.g. the supply conversion time periods TP1 and TP2 as shown in FIG. 7A). During the 2 supply conversion time periods TP1 and TP2, the conversion control circuit 32 operates the conversion switches (e.g. the conversion switches SW1-SW10 as shown in the figure) by the switch control signal CTRL so as to electrically connect the first and the second conversion capacitors C1 and C2 between a pair of nodes selected from the plural supply voltage division nodes (e.g. NS1 and NS2 as shown in FIG. 7A), the battery voltage VBAT, and the ground node periodically, such that the voltage scale-up factor is substantially 3/2, wherein in a steady state in the supply mode, the voltages across the first and the second capacitors C1 and C2 are both substantially 1/2 of the battery voltage VBAT.

Still referring to the embodiment shown in FIG. 7A, more specifically, during the supply conversion time period TP1, the plural conversion switches are controlled to electrically connect the first and the second conversion capacitors C1 and C2 in series between the battery voltage VBAT and the ground node, and during the supply conversion time period TP2, the plural conversion switches are controlled to electrically connect the first and the second conversion capacitors C1 and C2 in parallel between the supply voltage division NS2 and the battery voltage VBAT, wherein the capacitive power conversion circuit generates the output signal VPO through the supply voltage division NS2. The operations described above are repeated periodically such that the voltage scale-up factor is 3/2 in the steady state, wherein the voltages across the first and the second capacitors C1 and C2 are both substantially 1/2 of the battery voltage VBAT.

Figure 7B:
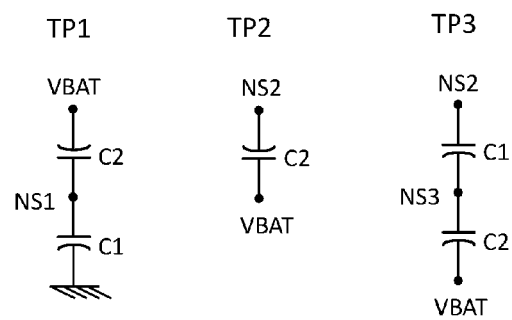

Referring to FIGS. 6 and 7B. FIG. 7B shows a schematic diagram of an equivalent circuit of the capacitive power conversion circuit during different supply conversion periods with a voltage scale-up factor J of 4/3. In the supply mode of this embodiment, the plural supply conversion time periods includes 3 supply conversion time periods (e.g. the supply conversion time periods TP1, TP2 and TP3 as shown in FIG. 7B). During the 3 supply conversion time periods TP1, TP2 and TP3, the conversion control circuit 32 operates the conversion switches (e.g. the conversion switches SW1-SW11 as shown in the figure) by the switch control signal CTRL so as to electrically connect the first and the second conversion capacitors C1 and C2 between a pair of nodes selected from the plural supply voltage division nodes (e.g. NS1, NS2 and NS3 as shown in FIG. 7B), the battery voltage VBAT, and the ground node periodically, such that the voltage scale-up factor is substantially 4/3, wherein in a steady state in the supply mode, the voltages across the first and the second capacitors C1 and C2 are substantially 2/3 and 1/3 of the battery voltage VBAT respectively.

Still referring to the embodiment shown in FIG. 7B, more specifically, during the supply conversion time period TP1, the plural conversion switches are controlled to electrically connect the first and the second conversion capacitors C1 and C2 in series between the battery voltage VBAT and the ground node, and during the supply conversion time period TP2, the plural conversion switches are controlled to electrically connect the second conversion capacitor C2 between the supply voltage division NS2 and the battery voltage VBAT, and during the supply conversion time period TP3, the plural conversion switches are controlled to electrically connect the first and the second conversion capacitors C1 and C2 in series between the supply voltage division NS2 and the battery voltage VBAT, wherein the capacitive power conversion circuit generates the output signal VPO through the supply voltage division NS2, and the polarity of C2 during the supply conversion time period TP3 is opposite to the polarity of C2 during the supply conversion time periods TP1 and TP2. The operations described above are repeated periodically such that the voltage scale-up factor 4/3 in a steady state in the supply mode, wherein the voltages across the first and the second capacitors C1 and C2 are both substantially 2/3 and 1/3 of the battery voltage VBAT respectively.

Note that the order of the supply conversion time periods and the voltage division relationship between the conversion capacitors in the previous 2 embodiments are illustrative but non-limiting examples; the order and the relationship can be modified.

Referring to FIGS. 5A, 5B and 6, in one embodiment, the capacitive power conversion circuit of the present invention (for example the aforementioned capacitive power conversion circuit 30A, 30B and 30C) can determine a preferred voltage scale-up factor J (for example selecting from one of the aforementioned options 3/2 and 4/3) according to a battery voltage related signal of VBAT and a target of the supply voltage VOUT, and adjust the connections of the plural conversion switches and the plural supply conversion time periods adaptively according to the preferred voltage scale-up J. Still referring to FIGS. 5B and 6, in one preferred embodiment, the preferred voltage scale-up J can make the output signal VPO to be close but still larger than the supply voltage VOUT, such that the voltage between an input node and an output node of the regulation switch SWG (i.e. VPO-VOUT) is smaller than a predetermined dropout voltage, which can better improve the conversion efficiency of the regulation switch SWG which operates in its linear region.

In one embodiment, the aforementioned USB OTG compliant load circuit (for example the load 70 shown in FIGS. 4, 5A, 5B or 6) is coupled to the capacitive power conversion circuit (for example the capacitive power conversion circuit 30, 30A, 30B or 30C shown in FIGS. 4, 5A, 5B and 6) by the aforementioned USB PD or USB compliant cable or connector.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. As an example, the capacitive power conversion circuit of the present invention may include multiple predetermined voltage scale-up factors such as the aforementioned 4/3 and 3/2, and one of the factors is dynamically chosen according to the battery voltage and the supply voltage. Furthermore, those skilled in this art can readily conceive variations and modifications within the spirit of the present invention. For example, plural capacitive power conversion circuits according to the present invention can be used in parallel to reduce equivalent resistance of the conversion circuit for increasing conversion efficiency. As another example, the capacitive power conversion circuit may further include a third conversion capacitor, and the plural supply conversion time periods include 3 supply conversion time periods, wherein in the supply mode, during the 3 supply conversion time periods, the switch control signal operates the conversion switches so as to electrically connect the first, the second, and the third conversion capacitors between a pair of nodes selected from the plural supply voltage division nodes, the battery voltage, and the ground node periodically, such that the voltage scale-up factor is substantially 7/4. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A capacitive power conversion circuit, configured to operably convert a DC power to a charging power on a bus node for charging a battery in a charging mode, wherein the DC power includes a DC voltage and a DC current, the charging power includes a charging voltage and a charging current, and the battery includes a battery voltage, and the capacitive power conversion circuit being configured to operably convert the battery voltage to a supply voltage in a supply mode; the capacitive power conversion circuit comprising:

a conversion switch circuit which includes plural conversion switches, configured to be operably coupled to one or more conversion capacitors; and a conversion control circuit, configured to operably generate a switch control signal to control the plural conversion switches;

wherein in the charging mode, the switch control signal operates the plural conversion switches so as to electrically connect the one or more conversion capacitors between a pair of nodes selected from one or more charging voltage division nodes, the DC output voltage, and a ground node periodically during plural charging conversion time periods, such that the charging current is scaled-up of the DC current substantially by a predetermined current scale-up factor, the current scale-up factor being larger than 1 whereby the charging current is larger than the DC current, wherein the charging power is electrically connected to one of the one or more voltage division nodes; and in the supply mode, the switch control signal operates the plural conversion switches so as to electrically connect the one or more conversion capacitors between a pair of nodes selected from one or more supply voltage division nodes, the battery voltage, and the ground node periodically during plural supply conversion time periods, to generate an output signal on one of the one or more supply voltage division nodes, and generate a supply voltage on the bus node according to the output signal, such that the supply voltage is scaled-up of the battery voltage substantially by a predetermined voltage scale-up factor.

2. The capacitive power conversion circuit of claim 1, wherein the one or more conversion capacitors include a first and a second conversion capacitors, and the plural supply conversion time periods includes 3 supply conversion time periods; wherein in the supply mode, during the 3 supply conversion time periods, the switch control signal operates the conversion switches so as to electrically connect the first and the second conversion capacitors between a pair of nodes selected from the plural supply voltage division nodes, the battery voltage, and the ground node periodically, such that the voltage scale-up factor is substantially 4/3, wherein in a steady state in the supply mode, the voltages across the first and the second capacitors are substantially 2/3 and 1/3 of the battery voltage respectively.

3. The capacitive power conversion circuit of claim 1, wherein the conversion capacitors include a first and a second conversion capacitors, and the plural supply conversion time periods includes 2 supply conversion time periods; wherein in the supply mode, during the 2 supply conversion time periods, the switch control signal operates the conversion switches so as to electrically connect the first and the second conversion capacitors between a pair of nodes selected from the plural supply voltage division nodes, the battery voltage, and the ground node periodically, such that the voltage scale-up factor is substantially 3/2, wherein in a steady state in the supply mode, the voltages across the first and the second capacitors are both substantially 1/2 of the battery voltage.

4. The capacitive power conversion circuit of claim 1, wherein the conversion capacitors include a first and a second conversion capacitors, and the plural charging conversion time periods includes a first and a second charging conversion time periods; wherein in the charging mode, the switch control signal operates the conversion switches so as to electrically connect a first node of the first conversion capacitor to the DC voltage and the charging voltage during the first and the second charging conversion time periods respectively, and electrically connect a second node of the first conversion capacitor to the charging voltage and the ground node during the first and the second charging conversion time periods respectively, and electrically connect a first node of the second conversion capacitor to the DC voltage and the charging voltage during the second and the first charging conversion time periods respectively, and electrically connect a second node of the second conversion capacitor to the charging voltage and the ground node during the second and the first charging conversion time periods respectively, such that the charging current is substantially 2 times the DC current.

5. The capacitive power conversion circuit of claim 1, further including a linear regulation circuit configured to operably convert the output signal to the supply voltage on the bus node in the supply mode, wherein the conversion control circuit further generates a linear regulation signal to control a regulation switch of the linear regulation circuit in a linear region of the regulation switch, such that the supply voltage is regulated to a predetermined output voltage, and in the charging mode, the regulation switch is controlled to be conductive.

6. The capacitive power conversion circuit of claim 1, wherein there are plural options of the predetermined voltage scale-up factors, and in the supply mode, the conversion control circuit further determines the predetermined voltage scale-up factor according to a battery voltage related signal, such that the output signal is close to but larger than the supply voltage and the voltage between an input node and an output node of the regulation switch is smaller than a predetermined dropout voltage.

7. The capacitive power conversion circuit of claim 1, wherein the input power is compliant with the Universal Serial Bus or Universal Serial Bus Power Delivery (USB or USB PD) specification, and the supply voltage is compliant with the USB On-The-Go (OTG) specification.

8. A power conversion method, comprising:
converting a DC power to a charging power on a bus node for charging a battery by a capacitive power conversion circuit in a charging mode, wherein the DC power includes a DC voltage and a DC current, the charging power includes a charging voltage and a charging current, and the battery includes a battery voltage; and
converting the battery voltage to a supply voltage in a supply mode;
wherein the capacitive power conversion circuit comprises a conversion switch circuit which includes plural conversion switches, configured to be operably coupled to one or more conversion capacitors;
wherein the step of converting the DC power to the charging power in the charging mode includes:
during plural charging conversion time periods, operating the plural conversion switches so as to electrically connect the one or more conversion capacitors between a pair of nodes selected from one or more charging voltage division nodes, the DC voltage, and a ground node periodically, such that the charging current is scaled-up of the DC current substantially by a predetermined current scale-up factor, the current scale-up factor being larger than 1 whereby the charging current is larger than the DC current; and
electrically connecting the charging power to one of the one or more charging voltage division nodes;
wherein the step of converting the battery voltage to the supply voltage in the supply mode includes:
during plural supply conversion time periods, operating the plural conversion switches so as to electrically connect the one or more conversion capacitors between a pair of nodes selected from one or more supply voltage division nodes, the battery voltage, and the ground node periodically to generate an output signal on one node among the one or more supply voltage division nodes; and
generating the supply voltage on the bus node according to the output signal, such that the supply voltage is scaled-up of the battery voltage substantially by a predetermined voltage scale-up factor.

9. The power conversion method of claim 8, wherein the conversion capacitors include a first and a second conversion capacitors, and the plural supply conversion time periods includes 3 supply conversion time periods; wherein in the supply mode, the step of converting the battery voltage to the supply voltage includes:

during the 3 supply conversion time periods, operating the conversion switches so as to electrically connect the first and the second conversion capacitors between a pair of nodes selected from the plural supply voltage division nodes, the battery voltage, and the ground node periodically, such that the voltage scale-up factor is substantially 4/3, wherein in a steady state in the supply mode, the voltages across the first and the second capacitors are substantially 2/3 and 1/3 of the battery voltage respectively.

10. The power conversion method of claim 8, wherein the conversion capacitors include a first and a second conversion capacitors, and the plural supply conversion time periods includes 2 supply conversion time periods; wherein in the supply mode, the step of converting the battery voltage to the supply voltage includes:

operating the conversion switches so as to electrically connect the first and the second conversion capacitors between a pair of nodes selected from the plural supply voltage division nodes, the battery voltage, and the ground node periodically, such that the voltage scale-up factor is substantially 3/2, wherein in a steady state in the supply mode, the voltages across the first and the second capacitors are both substantially 1/2 of the battery voltage.

11. The power conversion method of claim 8, further including:

in the supply mode, controlling a regulation switch of a linear regulation circuit in a linear region of the regulation switch to convert the output signal to the supply voltage on the bus node, wherein the supply voltage is regulated to a predetermined output voltage; and in the charging mode, controlling the regulation switch to be conductive.

12. The power conversion method of claim 11, wherein there are plural options of the predetermined voltage scale-up factors, the method further comprising: in the supply mode, determining the predetermined voltage scale-up factor according to a battery voltage related signal, such that the output signal is close to but larger than the supply voltage and the voltage between an input node and an output node of the regulation switch is smaller than a predetermined dropout voltage.

* * * * *